Jan. 3, 1956   O. B. MERRILL   2,728,982
METHOD OF MAKING BENDABLE WEATHER OR TRIM STRIP
Original Filed Dec. 22, 1949
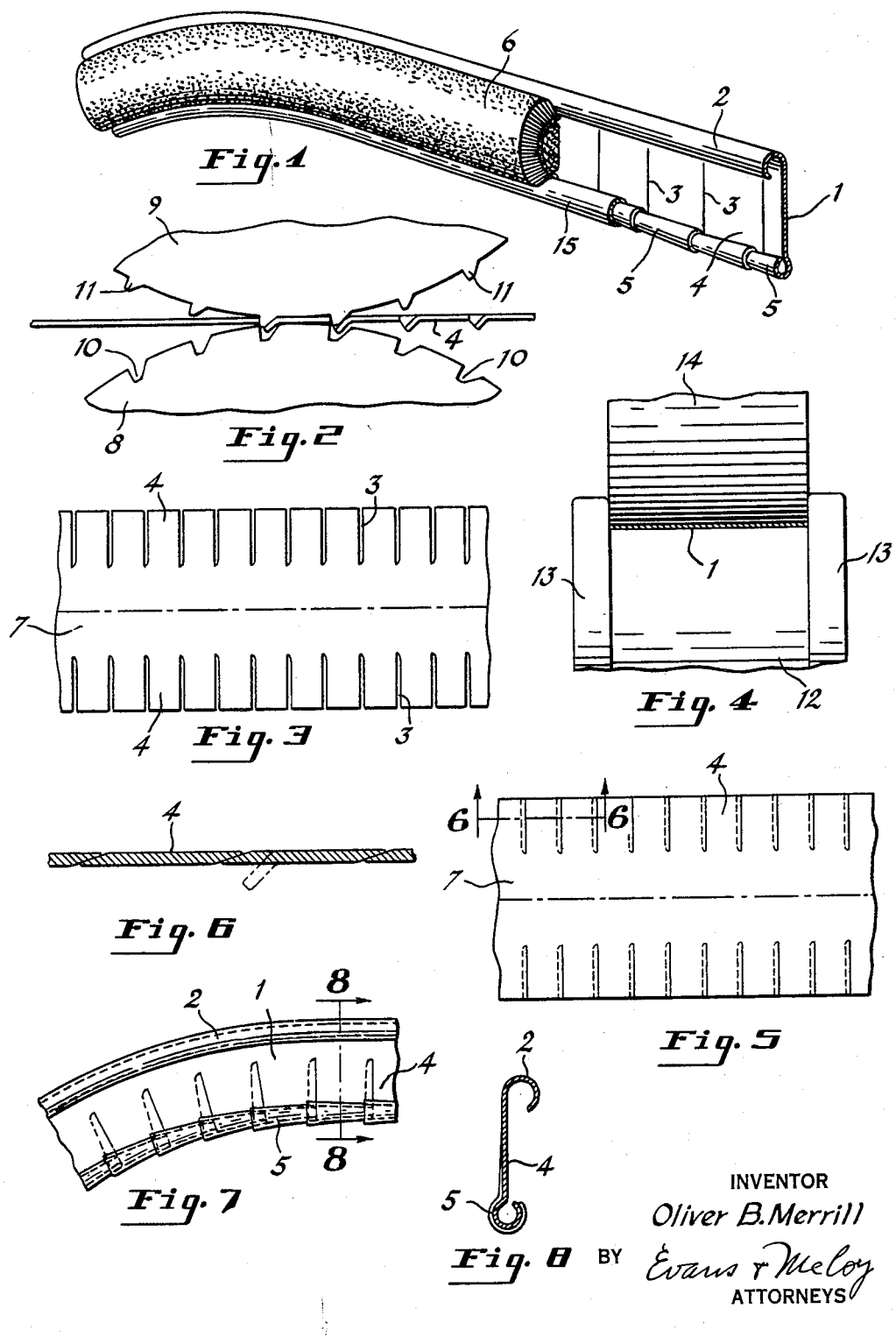
INVENTOR
Oliver B. Merrill
BY Evans & McCoy
ATTORNEYS

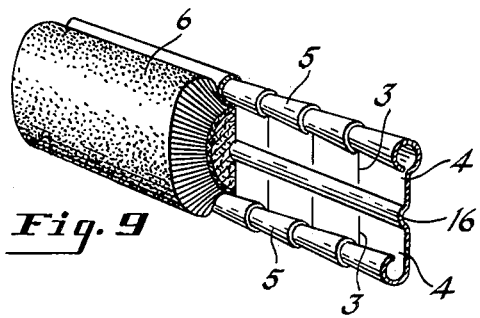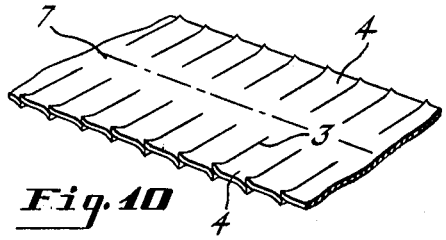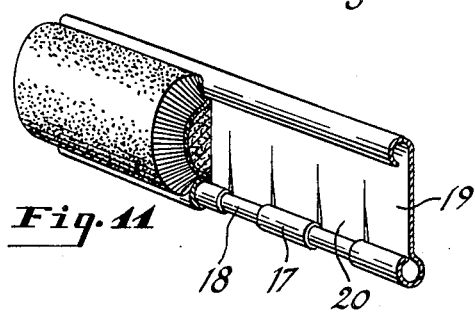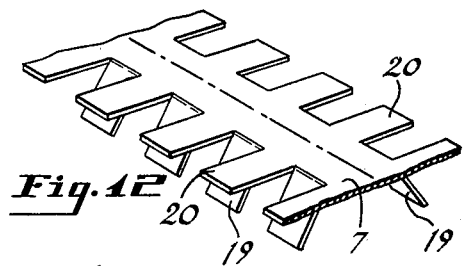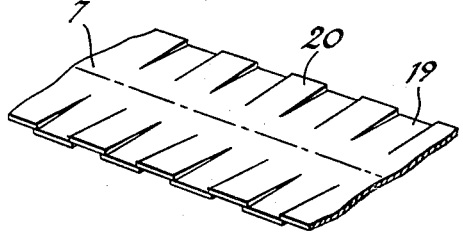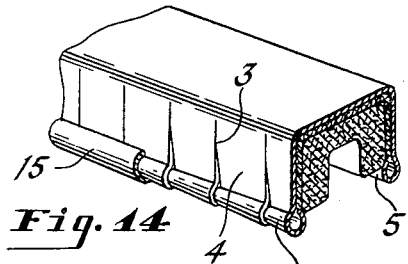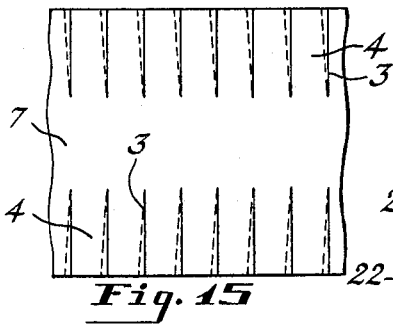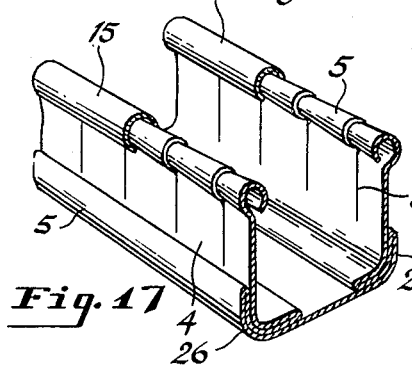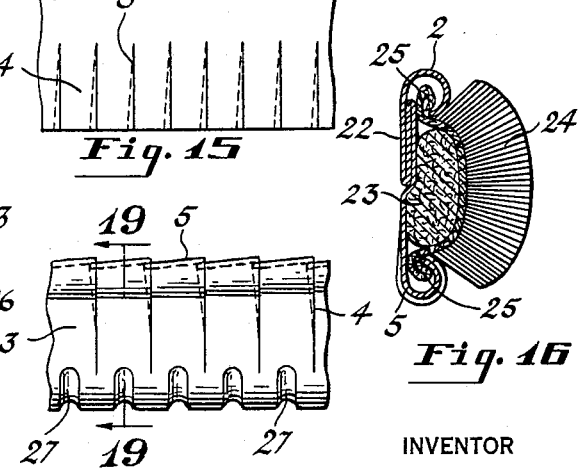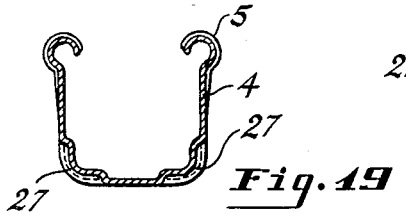

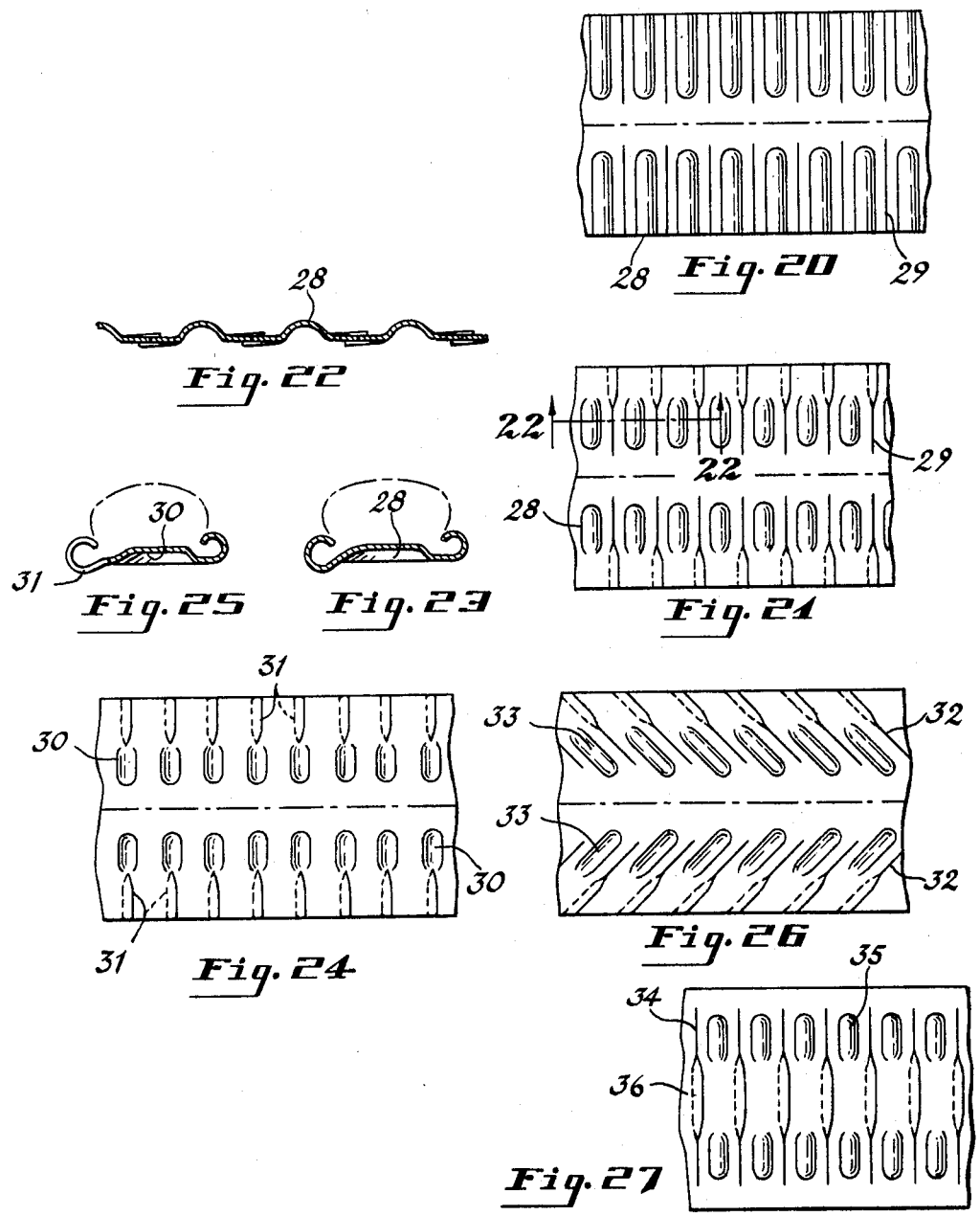

United States Patent Office 2,728,982
Patented Jan. 3, 1956

2,728,982

METHOD OF MAKING BENDABLE WEATHER OR TRIM STRIP

Oliver B. Merrill, Amesbury, Mass.

Original application December 22, 1949, Serial No. 134,464, now Patent No. 2,619,375, dated November 25, 1952. Divided and this application February 13, 1952, Serial No. 271,401

1 Claim. (Cl. 29—533)

This invention relates to the manufacture of weather or trim strips and more particularly to weather or trim strips of the type that has a portion adapted to conform to a flat surface and that is bendable in the plane of such portion to various shapes, and more particularly to a method of making bendable or trim strips with transverse slits which permit bending in the plane of the strips and a lapping tongue with telescopically connected edge channels such as disclosed and claimed in my copending application Serial No. 134,464, filed December 22, 1949, now Patent No. 2,619,375, granted November 25, 1952, the present application being a division of said application.

In forming the bendable sheet metal strip by the method of the present invention a flat sheet metal strip is subjected to shaping, slitting and pressing operations by which an edge of a continuous sheet metal strip is converted into a series of transversely disposed tongues which are overlapped at their edges so that the edge formed by overlapping tongues may be bent to form a continuous bead or channel that is composed of telescopically connected sections.

The present invention has for its object to provide a simple and economical method of making a bendable weather or trim strip with a continuous bead or channel along its slitted edge.

Reference should be had to the accompanying drawings forming a part of this specification in which:

Figure 1 is a perspective view of a weather or trim strip which may be produced by the method of the present invention;

Fig. 2 is a fragmentary view showing slitting wheels by means of which a sheet metal strip may be slitted and drawn in such manner that the tongues can be widened and overlapped by a subsequent pressing operation.

Fig. 3 is a fragmentary plan view of the slitted blank formed by the slitting wheels as shown in Fig. 2.

Fig. 4 is a fragmentary view showing a rolling operation by means of which pressure may be applied to the edges of the blank shown in Fig. 3 to widen the tongues and cause them to overlap.

Fig. 5 is a fragmentary plan view of a portion of the strip after the outer ends of the tongues have been drawn to increase their width and overlap their edges;

Fig. 6 is a section taken on the line indicated at 6—6 in Fig. 5;

Fig. 7 is a side elevation of a weather or trim strip such as shown in Fig. 1, having a portion thereof bent in the plane of the strip and showing the telescopic action of the channel sections formed by the outer end of the tongues;

Fig. 8 is a transverse section taken on the line indicated at 8—8 in Fig. 7;

Fig. 9 is a fragmentary perspective view showing a weather or trim strip which may be made by the method illustrated in Figs. 2 to 5 having overlapping tongues along both its edges so that each edge is contractible and the strip may be bent in either direction in its plane;

Fig. 10 is a fragmentary perspective view of the slitted blank from which the strip shown in Fig. 9 is formed;

Fig. 11 is a fragmentary perspective view of a trim or weather strip in which both edges of each tongue overlap adjacent tongues on the same side and in which the telescopically engaging rolled ends of the tongues are substantially cylindrical in form;

Figs. 12 and 13 are fragmentary perspective views of the blank from which the strip shown in Fig. 11 is formed showing the same at successive stages in the process of forming the strip, Fig. 12 showing the manner in which the tongues are initially formed and spread apart in the drawing operation, and Fig. 13 showing the tongues bent back into contact with one another;

Fig. 14 is a fragmentary perspective view of a channel shaped strip which may be produced by the method of the present invention;

Fig. 15 is a fragmentary plan view of the blank from which the strip shown in Fig. 14 is formed;

Fig. 16 is a transverse section through a weather or trim strip in which the body of the strip is reinforced by a longitudinally extending fold;

Fig. 17 is a fragmentary perspective view showing a bendable channel strip reinforced at the edges of the channel bottom by longitudinally extending folds;

Fig. 18 is a fragmentary side elevation of a bendable channel strip reinforced at the edges of the channel bottom by transversely extending indentations;

Fig. 19 is a transverse section taken on the line indicated at 19—19 in Fig. 18;

Figs. 20 to 23 illustrate a modified method of making a bendable weather or trim strip by drawing, slitting and pressing operations;

Fig. 20 is a plan view of a blank that has been shaped and slitted to form tongues with longitudinal indentations;

Fig. 21 is a plan view of the blank shown in Fig. 20 after the outer end portion of the tongues have been flattened by pressure to increase their width and to dispose them in overlapping relation;

Fig. 22 is a fragmentary longitudinal section taken on the line indicated at 22—22 in Fig. 21;

Fig. 23 is a section through the finished strip formed from the blank shown in Fig. 21;

Fig. 24 is a fragmentary plan view of a blank formed by drawing, slitting and pressing in a manner similar to that illustrated in Figs. 20 and 21 except that the slits are formed in the indentations instead of between the indentations;

Fig. 25 is a transverse section through the strip formed from the blank shown in Fig. 24;

Fig. 26 is a fragmentary plan view of a slitted and indented blank similar to Fig. 21 except that the slits and indentations are diagonally disposed; and Fig. 27 is a fragmentary plan view of a slitted indented blank, showing a modified method of forming a strip such as shown in Fig. 23.

Cushioning and sealing strips such as those employed in the glass runs of automobile body windows are commonly formed with a sheet metal body to which a facing of suitable cushioning material is attached. Such strips may be flat for engagement with one side of a window pane or may be in the form of a channel adapted to receive an edge of a glass pane. In either case an essential requirement of such strips is that they be readily bendable to conform to the shape of the window opening to which they are applied. In the case of flat strips the sheet metal backing must be so formed that it is bendable in its own plane and in the case of channel shaped strips the flanges of the sheet metal channel must be so formed that they are bendable in their own plane.

The weather or trim strips shown in my copending application are so formed that one or both edges thereof are contractible to permit bending, the contractible edge in each instance being formed by overlapping tongues which are movable one over another as the strip is bent, the same overlapping tongue structure being employed to provide contractible edges on either flat or channel shaped strips. The method herein disclosed is applicable to the making of cushioning and sealing strips of either flat or channel form.

In the accompanying drawings Fig. 1 shows a weather strip which has a substantially flat body portion 1 and which has one edge bent to form a retaining channel 2. The strip is also provided with transverse slits 3 which extend transversely of the strip from the edge opposite the channel 2 and which terminate short of the channel 2. The slits 3 are regularly spaced and form a series of elongated tongues 4 which are relatively movable to provide the strip with a contractible portion that permits the strip to be bent in its plane to various desired shapes. The contractible portion of the strip formed by the tongues 4 is rolled inwardly throughout the length of the strip to provide a retaining channel 5 at the outer end of each tongue 4 which faces the channel 2, the channels 5 forming sections of a longitudinal retaining channel on the contractible side of the strip, and because of the lapping relation of the tongues the channels 5 taper longitudinally and have telescopic engagement, being slidable one within another to permit bending of the strip as shown in Fig. 7.

The sheet metal strip forms a bendable base for a sealing or trim strip of flexible material, the flexible strip 6 shown in the accompanying drawings being a sealing and cushioning strip such as commonly provided on glass run guides. The sheet metal base strip may be formed from a flat strip of sheet metal such as shown in Fig. 3 of the drawings, in which slits 3 have been formed that extend from opposite edges toward a longitudinally continuous central portion 7 of the strip.

An important object of the present invention is to provide a strip which has one edge portion composed of tongues which are widened at their outer ends so that they overlap when the strip is straight, and slide one upon another when the strip is bent. The widened tongues are formed by shaping, slitting and pressing operations by means of which the metal of each tongue is decreased in thickness, increased in width and caused to overlap at the edge of the tongue.

The widening and lapping of the tongues may be effected by the slitting, drawing and rolling operations as illustrated in Figs. 2 and 4, by slitting, drawing and bending operations as illustrated in Figs. 12 and 13, or by forming indentations in the body of the strip to decrease the thickness of the metal in spaced portions of the strip and flattening the indentations after the slitting operations to form widened tongues as illustrated in Figs. 20, 21, 24, 26 and 27.

A blank such as shown in Fig. 3 can be cut along its longitudinal center line to form two base strips such as shown in Fig. 1, or bent into the form of a channel such as shown in Figs. 14, 17 or 19.

The slitting operation may be performed as shown in Fig. 2 by means of a pair of slitting wheels 8 and 9 provided with cutting teeth 10 and 11 which are shaped to form the slits 3 and to offset one edge of each tongue 4 angularly with respect to the continuous central portion 7.

After the slitting and drawing operations pressure is applied to the opposite edges of the blank, preferably by means of rollers which apply pressure to the slitted edges of the blank. Fig. 4 shows a roller 12 which has shoulders 13 at its opposite sides providing a circumferential channal of a width corresponding to the width of the sheet metal strip, and a roller 14 of a width to be received in the channel of the roller 12. When the sheet metal strip is passed between the wheels 8 and 9 the indented edge portions of the tongues 4 are slightly drawn or stretched so that when the tongues 4 are flattened between the rollers 12 and 14 the deflected edges of the tongues 4 will overlap the edges of adjacent tongues. By applying suitable pressure to the roller 14 the lapping edges of the tongues 4 may be further drawn or stretched to increase their overlap as shown in Fig. 6.

After the slitting and drawing operations the blank may be severed along its longitudinal center line, and each of the two identical blanks so formed may be bent to provide the strip retaining channels 2 and 5.

Since the outer ends of the tongues are lapped along the collapsible edge of the strip, the retaining channel along the contractible edge is composed of tapered telescopically connected sections 5 such as shown in Figs. 1 and 7, which telescope one into another when the strip is bent as shown in Fig. 7, to concave the contractible edge of the strip.

By forming the strip with contractible portions composed of overlapping tongues, the contractible portion is longitudinally continuous and the use of a retaining strip or bead to hold the tongues in alignment is not essential. However, an ornamental covering bead 15 such as shown in Fig. 1 may be provided if desired. When a covering bead 15 is employed the telescopic connection of the channel sections 5 is advantageous in that the telescoping of the sections 5 along a bend expands the large ends of the sections 5 against the interior of the bead 15 and provides a frictional interlock that resists sliding of the bead 15 on the edge of the strip.

Since the contractible edge portion of the strip of the present invention forms a continuous retaining channel, it is feasible to form a strip in which both edges are contractible so that the strip may be bent in its plane in either direction. Fig. 9 of the drawing shows a strip having its opposite edges contractible and Fig. 10 shows the blank from which the strip is made. The strip has slits 3 extending inwardly from its opposite side edges to form tongues 4, and the tongues 4 at opposite edges of the strip are rolled inwardly to provide tapering retaining sections 5 at the outer end of each tongue, the channel sections being telescopically connected throughout the length of the strip. In order to increase the stiffness of the strip, the continuous central portion of the strip may be bent along longitudinal lines to provide a longitudinal stiffening member such as the rib 16. The strip shown in Fig. 9 is bendable in its plane in either direction and the telescopically connected channel sections 5 provide continuous retaining channels for the cushioning member 6 throughout the length of the strip.

Fig. 11 shows weather or trim strip which has a contractible edge portion provided with a retaining channel formed by telescopically connected channel sections 17 and 18 formed at the outer ends of tongues 19 and 20. The channel sections 17 and 18 are substantially cylindrical in form, the sections formed at the outer ends of the tongues 19 being of larger diameter than the channel sections 18 formed at the ends of the tongue 20 and telescopically receiving the ends of the tongues 20. The tongues 19 are offset slightly with respect to the plane of the strip so that the edges of the tongues 20 overlap the adjacent tongues 19 on the same side of the strip, and the inner edges of the channel sections 17 of the tongues 19 are spaced sufficiently from the body of the strip to permit the tongues 20 to slide on the tongues 19 when the strip is bent.

The method of forming the strip shown in Fig. 11 is illustrated in Figs. 12 and 13. The first step consists of striking up the tongues 19 from the body of the strip and increasing the width of the tongues by a drawing operation in which pressure is applied to the outer ends of one or both of the sets of tongues 19 and 20. The tongues 19 are then bent back against the tongues 20 as shown in Fig. 13, and the ends of the tongues are then rolled to form the telescopically joined bead or channel sections 17 and 18.

In manufacturing flat trim strips or weatherstrips such as shown in Figs. 1, 7, 9 and 11, a sheet metal blank is preferably formed with tongues along opposite side edges thereof and, where the strip is bendable in one direction only, the blank is of a width such that two identical strips may be formed from the halves of the blank obtained by severing the blank along its longitudinal center line. A bendable window channel can be made from blanks similarly formed by bending the continuous central portion of the strip along parallel longitudinal lines to dispose the contractible edge portions in flanges which are disposed at substantially right angles to the base of a channel. The flanges of the channel so formed are bendable in the planes thereof and the overlapping tongues are slidable one upon another to allow contraction of the edges of the flanges in exactly the same way as in the flat strips. The web of the channel being substantially flat is bendable to conform to the curvature to which the channel is bent.

Fig. 14 shows a window channel in which the flanges are provided with tongues 4 having their edges bent to provide tapering channel sections 5 which are disposed with the small edge of one section telescoping into the large end of the next adjacent section. The channel shown in Fig. 14 may be made from a blank such as shown in Fig. 15 which corresponds to the blank shown in Fig. 5 except that the central continuous portion 7 is made of a width suitable for the base of the channel, and the tongues 4 are of a length required to provide flanges of the desired depth.

In Fig. 16 of the drawings a window strip is shown that is provided with overlapping tongues having tapering telescopically connected channel sections 5 at the edge thereof and in which the continuous body portion of the strip has a longitudinal stiffening member in the form of a plurality of superposed folds 22 formed by bending the body portion upon itself along longitudinal lines. Cushioning and sealing means similar to that shown in Figs. 1, 9 and 11 may be applied to the strip shown in Fig. 16, the cushioning means comprising a fiber filler strip 23 bearing against the body of the sheet metal strip, and a deep pile fabric 24 covering the filler strip 23, the pile fabric 24 having edge hems 25 that are retained within the opposed channels 2 and 5 of the strip.

Fig. 17 of the drawings shows a sheet metal strip suitable for a window channel base in which the body portion of the strip has longitudinal reinforcing members 26 at the opposite sides of the base of the channel which are formed by bending the body of the strip to form superposed folds. Aside from the folds 26, the channel shown in Fig. 17 is formed in the same manner as the channel shown in Fig. 14, the flanges being made contractible by means of overlapping tongues 4 and telescoping channel sections 5.

In Figs. 18 and 19 a window channel base is shown having flanges formed in the same manner as the channels shown in Figs. 14 and 17 but having transversely extending indentations which form stiffening ribs 27 at the juncture of the flanges with the base of the channel.

If an overlap of considerable width at the edges of the tongues is desired such an overlap may be provided by pressing elongated transverse indentations in the sheet metal blank, slitting the blank transversely to form the tongues and widening the tongues by flattening portions of the indentations. In forming the indentations in the sheet metal strip the metal deflected from the plane of the strip is drawn to a lesser thickness and when the indentations are flattened the width of the tongues is materially increased. By making the indentations of a length greater than the overlap and flattening only a portion of each indentation, reinforcing ribs may be provided in the completed strip. Several variations of the indenting, slitting and flattening method referred to are shown in Figs. 20 to 27 inclusive.

In forming the strip by the method illustrated in Figs. 20 to 23 inclusive, regularly spaced elongated transverse indentations 28 are formed in the sheet metal strip that extend from the edges toward the center at right angles to the edges. Slits 29 intermediate the indentations and parallel thereto form the tongues. By flattening the strip along the outer ends of the tongues, the outer ends of the tongues are widened and caused to overlap as shown in Figs. 21 and 22. Blanks such as shown in Fig. 21 may be severed along a center line to provide blanks for flat strips such as shown in Fig. 23 or may be bent to form a window channel of the type shown in Fig. 14. The inner portions of the indentations 28 are preferably not disturbed, so that the finished strip is reinforced by the indentations which form transverse stiffening ribs in the body of the strip as shown in Fig. 23.

Instead of forming the slits between the indentations as shown in Figs. 20 and 21, the slits may be formed centrally of the elongated indentations as shown in Fig. 24, where the blank is provided with indentations 30 and slits 31 which are disposed centrally of the indentations, but which preferably terminate short of the inner ends of the indentations as shown in Fig. 25. As in the modification previously described, the outer ends of the tongues are widened by drawing and overlapped by flattening the indentations previously formed in the strip. The blank shown in Fig. 24 may be severed along a center line to provide blanks for strips such as shown in Fig. 25 or may be bent to form a channel of the type shown in Fig. 14. The inner portions of the indentations 30 which are not flattened provide stiffening ribs.

In Fig. 26 of the drawings a blank is formed which is the same as the blank shown in Fig. 21 except that the slits 32 and the indentations 33 are disposed diagonally instead of at right angles to the side edges of the strip. As in the modifications previously described, the central portion of the blank is longitudinally continuous and the strip may be severed along the longitudinal center line after the slitting, indenting and flattening operations have been performed, or may be bent to channel form.

Fig. 27 of the drawings illustrates a method in which the lapping tongues are formed in the central portion of the blank. In forming the strip by this method, slits 34 are transversely disposed and extend across the major portion of the width of the strip, but terminate short of the side edges of the strip. Between the slits, transverse indentations 35 are formed which also terminate short of the side edges of the strip, and the central portions of the transverse indentations 35 lying between the slits 34 are flattened to widen the webs between the indentations and cause them to overlap, as indicated at 36 centrally of the strip. After the flattening of the indentations, the strip may be severed along a longitudinal center line to provide two blanks substantially identical with the blanks formed by severing of the strip shown in Fig. 21.

It is to be understood that in accordance with the provisions of the patent statutes, variations and modifications of the specific devices herein shown and described may be made without departing from the spirit of the invention.

What I claim is:

The herein described method of forming a bendable sheet metal base for a weather or trim strip which comprises forming slits in a sheet metal strip extending inwardly from a longitudinal edge thereof to provide a series of elongated tongues disposed side by side along the length of the strip, bending an edge of each tongue laterally, and rolling the slitted edge of the strip to flatten the bent edges of the tongues to widen the tongues and dispose the edges of the widened tongues in lapping relation.

(References on following page)

References Cited in the file of this patent

UNITED STATES PATENTS

| | | | |
|---|---|---|---|
| 246,232 | Spencer | Aug. 23, | 1881 |
| 430,000 | Clark | June 10, | 1890 |
| 1,341,967 | Barrows | June 1, | 1920 |
| 1,550,999 | Wupperman | Aug. 25, | 1925 |
| 1,908,864 | Reid | May 16, | 1933 |
| 1,927,791 | Balfe | Sept. 19, | 1933 |
| 1,987,176 | Biggert | Jan. 8, | 1935 |
| 1,996,561 | Ball | Apr. 2, | 1935 |
| 2,018,085 | Otte | Oct. 22, | 1935 |
| 2,026,972 | Greene | Jan. 7, | 1936 |
| 2,041,956 | Reid | May 26, | 1936 |
| 2,058,793 | Hoffman | Oct. 27, | 1936 |
| 2,102,936 | Bailey | Dec. 21, | 1937 |
| 2,619,375 | Merrill | Nov. 25, | 1952 |